United States Patent [19]
Kyrtsos

[11] Patent Number: 5,992,579
[45] Date of Patent: Nov. 30, 1999

[54] METHOD AND APPARATUS FOR DETECTING AN IMPROPERLY ADJUSTED SLACK ADJUSTER

[75] Inventor: Christos T. Kyrtsos, Southfield, Mich.

[73] Assignee: Meritor Heavy Vehicle Systems, LLC, Troy, Mich.

[21] Appl. No.: 08/908,497

[22] Filed: Aug. 7, 1997

[51] Int. Cl.⁶ .............................. F16D 66/00; F16D 51/00
[52] U.S. Cl. .................................... 188/79.52; 188/1.11 L
[58] Field of Search .............................. 188/79.52, 79.51, 188/1.11 W, 1.11 L, 1.11 E; 340/453, 454, 449

[56] References Cited

U.S. PATENT DOCUMENTS

| | | | |
|---|---|---|---|
| 3,983,970 | 10/1976 | Courbot | 188/79.52 |
| 4,020,454 | 4/1977 | Malonee | 188/1.11 L |
| 4,385,681 | 5/1983 | Conrad et al. | 188/79.52 |
| 4,390,086 | 6/1983 | Conrad | 188/79.52 |
| 4,476,963 | 10/1984 | Palmer et al. | 188/79.52 |
| 4,558,766 | 12/1985 | Palmer et al. | 188/79.54 |
| 4,674,326 | 6/1987 | Reinecke | 188/1.11 R |
| 4,685,745 | 8/1987 | Reinecke | 303/100 |
| 4,706,783 | 11/1987 | Rath et al. | 188/79.52 |
| 4,790,606 | 12/1988 | Reinecke | 188/1.11 R |
| 4,804,072 | 2/1989 | Michoux et al. | 188/79.52 |
| 4,809,826 | 3/1989 | Charbonnier | 188/79.52 |
| 5,246,090 | 9/1993 | Quere et al. | 188/79.52 |
| 5,429,213 | 7/1995 | Iizuka et al. | 188/79.52 |

FOREIGN PATENT DOCUMENTS 2266568  3/1993  United Kingdom .

OTHER PUBLICATIONS

Braking of Road Vehicles by T.P. Newcombe and R.T. Spurr (Principal Research Officers, Ferodo Ltd); pp. 130–179; Chapman and Hall Ltd., London, Undated, Pre. Aug. 7, 1997.

*Primary Examiner*—Chris Schwartz
*Attorney, Agent, or Firm*—Howard & Howard

[57] ABSTRACT

A method and apparatus for monitoring slack adjustment for braking in a vehicle is applicable to either drum or disc brake assemblies. The vehicle has several axle assemblies each with a pair of brake assemblies. A typical disc brake assembly includes a rotating disc, an actuator, a caliper with a brake lining supported on a backing plate, and a slack adjuster for adjusting the travel distance of the caliper to the disc. The actuator moves the brake linings of the caliper into contact with the rotating disc to brake the vehicle, resulting in a temperature increase in the brake linings. Temperature sensors are embedded in the brake linings of each brake assembly on each axle of the vehicle. The temperature of each brake lining is measured and compared with the temperature of the brake lining of its brake pair on the same axle. If the ratio of the two brake lining temperatures achieves a predetermined limit, a slack adjuster is deemed out of adjustment and a warning signal is sent to the vehicle operator.

20 Claims, 4 Drawing Sheets

METHOD AND APPARATUS FOR DETECTING AN IMPROPERLY ADJUSTED SLACK ADJUSTER

BACKGROUND OF THE INVENTION

This invention relates to a unique method and apparatus for monitoring brake slack adjustment in a vehicle.

A typical vehicle configuration includes several axle assemblies each with a pair of brake assemblies, one brake assembly at each wheel. The brake assemblies are typically either disc or drum type brakes and can be actuated hydraulically or pneumatically. For example, a typical disc brake assembly includes a rotating disc, an actuator, a caliper with a brake lining supported on a backing plate, and a slack adjuster for adjusting the travel distance of the caliper to the disc. The actuator moves the brake lining on the caliper into contact with the rotating disc to brake the vehicle, resulting in a temperature increase in the brake lining. As the lining wears, the distance that the caliper has to travel before it contacts the disc increases. The slack adjuster automatically adjusts the caliper such that the distance between the brake lining and the disc is optimal.

Over a period of time, slack adjusters can get out of adjustment which can result in ineffective braking. If the slack adjuster is over adjusted, the distance between the brake lining and the disc is too small which can result in the lining rubbing against the disc during non-braking conditions, and causing premature lining wear. If the slack adjuster is under adjusted, the distance between the brake lining and the disc is too large, resulting in delayed braking power. Thus, it is important to know when the slack adjusters are out of adjustment, so that they can be re-adjusted to provide optimal braking performance.

SUMMARY OF THE INVENTION

The subject invention relates to an apparatus and method for monitoring brake slack adjustment in a vehicle. The vehicle includes several axle assemblies each of which has a pair of brake assemblies. The slack adjustment can be monitored for drum or disc brake assemblies. In a disc brake application, the disc brake assembly includes a rotating disc, an actuator, a caliper with a brake lining supported on a backing plate, and a slack adjuster for adjusting the travel distance of the caliper to the disc. The actuator moves the caliper into contact with the rotating disc to brake the vehicle such that the surface of the brake lining contacts the disc. This frictional contact results in a temperature increase in the brake linings. The temperature of the brake lining is measured for each brake assembly on an axle during each brake application. The two brake lining temperatures are compared to each other and if the ratio of the two temperatures achieves a predetermined limit, a warning signal is sent to the vehicle operator indicating an out of adjustment slack adjuster.

A method for monitoring slack adjustment for braking in a vehicle includes providing an axle with at least first and second brake assemblies, each brake assembly including a first rotating member disposed about an axis of rotation, an actuator, at least one second member having a brake lining supported by a backing plate, and a slack adjuster for adjusting second member travel distance with respect to the first member as the brake linings wear. In the method the second members are actuated against the first members of the first and second brake assemblies. A first brake lining signal is produced in response to measuring the temperature of the brake lining of the first brake assembly, and a second brake lining signal is produced in response to measuring the temperature of the brake lining of the second brake assembly. The first brake lining signal is compared to the second brake lining signal and a first warning signal is produced to indicate an improperly adjusted slack adjuster when the ratio of the first brake lining signal to the second brake lining signal achieves a predetermined limit.

The apparatus to carry out the invention includes using at least first and second brake assemblies, each brake assembly including a rotating member disposed about an axis of rotation, a friction member having a brake lining supported by a backing plate, an actuator for actuating the friction member against the rotating member, and a slack adjuster for adjusting the friction member travel distance with respect to the rotating member as the brake lining wears. A first sensor assembly measures the temperature of the brake lining for the first brake assembly and produces a first brake lining signal. A second sensor assembly measures the temperature of the brake lining for the second brake assembly and produces a second brake lining signal. A processor compares the first brake lining signal to the second brake lining signal and activates a warning device, indicating an out of adjustment slack adjuster, when the ratio of the first brake lining signal to the second brake lining signal achieves a predetermined limit.

Thus, the subject invention offers a simple and effective system for monitoring brake slack adjustment based on brake lining temperature measurements.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
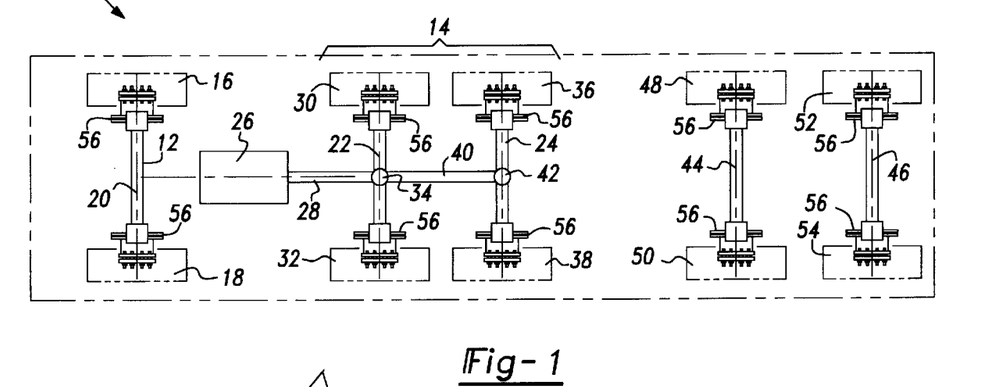
FIG. 1 is a top view of a powertrain system utilizing the method and apparatus of subject invention for monitoring brake slack adjustment.

FIG. 1 shows a basic tractor trailer powertrain system 10 for a heavy vehicle. The powertrain system 10 includes a front non-drive axle 12 and a tandem rear drive axle 14. The front non-drive axle 12 includes first 16 and second 18 non-driven wheels interconnected by an axle beam 20. The tandem rear drive axle 14 includes first 22 and second 24 rear drive axles. The rear drive axles 22, 24 are driven by torque from an engine 26 which is transmitted to the axles 22, 24 via a driveshaft 28. The first rear drive axle 22 includes first 30 and second 32 driven wheels rotated by the driveshaft 28 through a first main differential 34. The second rear drive axle 24 includes third 36 and fourth 38 driven wheels rotated by a thru-shaft 40 via a second main differential 42. The powertrain system 10 also includes a first 44 and second 46 non-driven trailer axles which support a trailer (not shown) for hauling cargo. The first trailer axle has third 48 and fourth 50 non-driven wheels and the second trailer axle has fifth 52 and sixth 54 non-driven wheels.

Each non-driven 16, 18, 48, 50, 52, 54 and driven 30, 32, 36, 38 wheel typically includes a brake assembly 56. These brake assemblies 56 can be of the drum or disc brake type and their general operation is known. While the brake assembly 56 shown in FIGS. 1, 2A, and 2B are a disc brake assemblies, it should be understood that the subject invention can be utilized with either a drum or disc brake assembly.

Figure 2A:
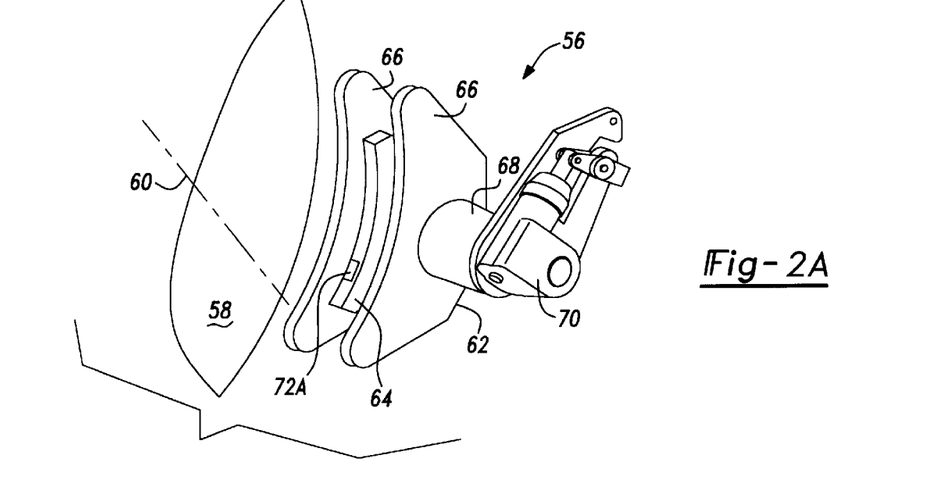
FIG. 2A is a front view of a disc brake assembly.
Figure 2B:
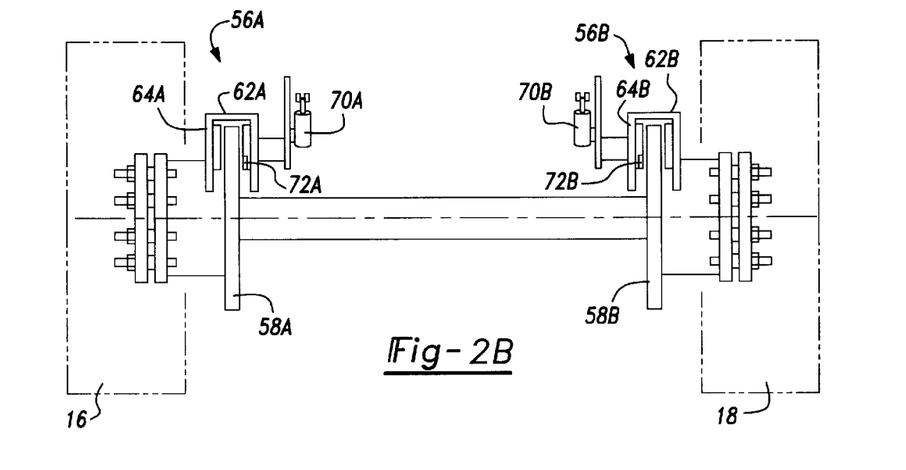
FIG. 2B is a front view of an axle assembly.

As shown in FIG. 2A, each disc brake assembly 56 includes a rotating member or disc 58 disposed about an axis of rotation 60, a friction member or caliper 62 having a brake lining 64 supported by a backing plate 66, an actuator 68 for actuating the caliper 62 against the disc 58, and a slack adjuster 70 for adjusting the caliper travel distance with respect to the disc 58 as the brake lining 64 wears. Embedded in the brake lining 64 is a first sensor assembly 72A for measuring the temperature of the brake lining 64 during a braking application and producing a first brake lining signal 74.

As previously mentioned, each axle assembly 12, 22, 24, 44, 46 includes a pair of brake assemblies 56, one located at each wheel 16, 18, 30, 32, 36, 38, 48, 50, 52, 54. FIG. 2B shows an exemplary axle assembly 12 with a first brake assembly 56A and a second brake assembly 56B located at the first 16 and second 18 wheels, respectively. Each brake assembly 56A, 56B is preferably identical to each other and is as shown and described in FIG. 2A. The first brake assembly 56A includes the first sensor 72A and the second brake assembly 56B includes a second sensor 72B, preferably identical to the first sensor assembly 72A. The second sensor 72B measures the temperature of the brake lining 64 of the second brake assembly 56B during a braking application and produces a second brake lining signal 76.

Figure 3:
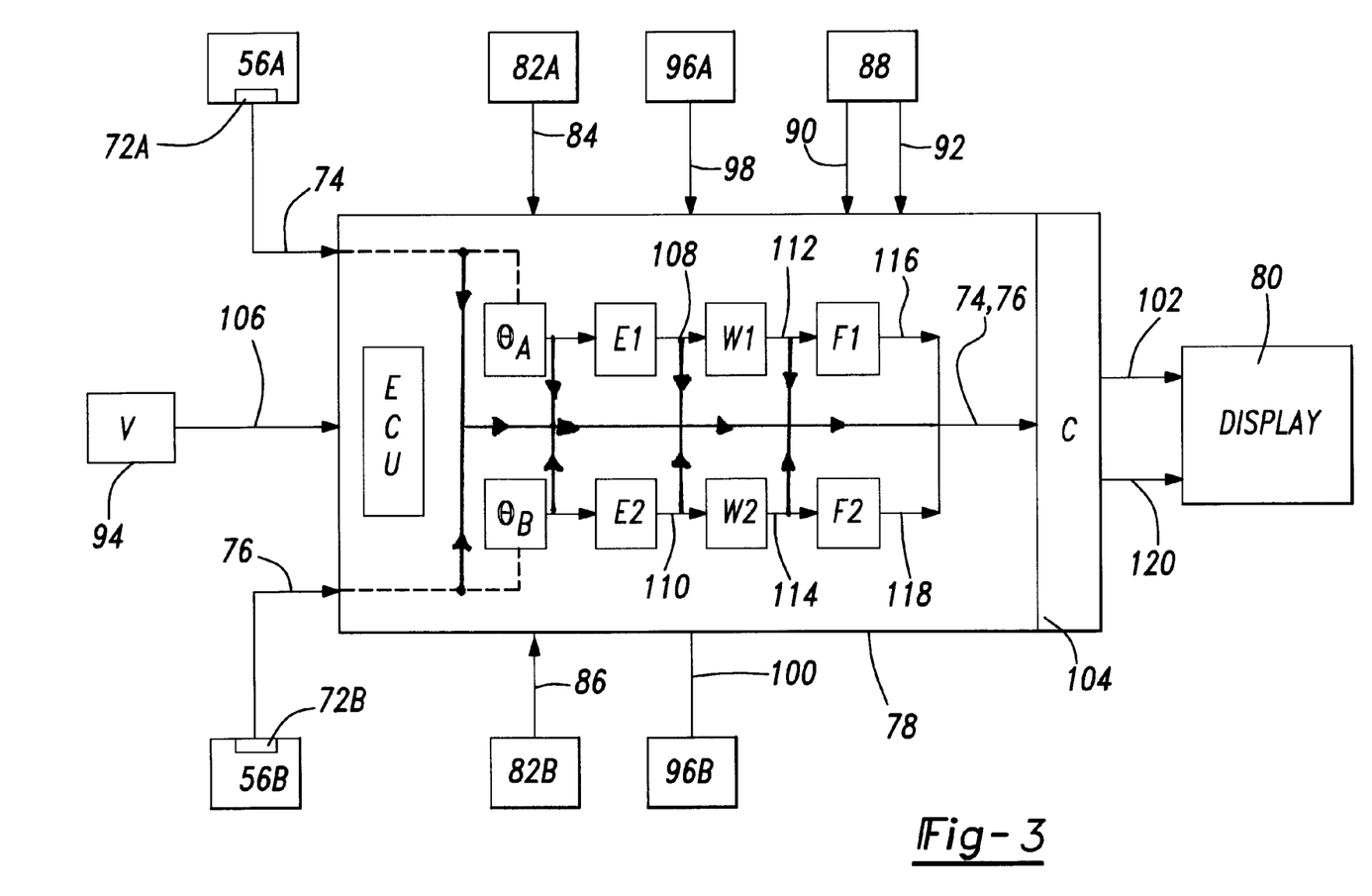
FIG. 3 is a schematic view of the subject invention.

Associated with the first brake assembly 56A, is a third sensor 82A, shown schematically in FIG. 3, for measuring the time period, $t_s$, from when the caliper 62A is first applied against the rotating disc 58A during a braking application to when the disc 58A stops rotating. A fourth sensor 82B, preferably identical to the third sensor 82A, is associated with the second brake assembly 56B, and measures the time period, $t_s$, for the disc 58B to stop rotating during a braking application for the second brake assembly 56B. The third 82A and fourth 82B sensors each produce first 84 and second 86 rotation signals, respectively. In the preferred embodiment speed pick up sensors, which are well known in the art, are used for these measurements, however, other sensors known in the art could be used.

Also associated with the first brake assembly 56A is a sixth sensor 96A for measuring wheel distance travel during a braking application for the first wheel 16. A seventh sensor 96B, preferably identical to the sixth sensor 96A, is associated with the second brake assembly 56B and measures the wheel distance travel for the second wheel 18. The sixth 96A and seventh 96B sensors each produce first 98 and second 100 wheel distance signals, respectively.

The first 74 and second 76 brake lining signals, the first 84 and second 86 rotation signals, and the first 98 and second 100 wheel distance signals are transmitted to a electronic control unit (ECU) or central processor 78, shown schematically in FIG. 3. The central processor 78 compares the first brake lining signal 74 to the second brake lining signal 76 and if their ratio achieves a predetermined limit, a warning device or display 80 is activated by a warning signal 102 indicating an out of adjustment slack adjuster 70. It should be understood that the predetermined limit can vary depending upon how the brake lining signals 74, 76 are compared to each other. For example, if the ratio is determined by dividing the smaller brake lining signal by the greater brake lining signal, such that their ratio is less than or equal to one, the warning signal 102 may be produced when the ratio is less than a certain predetermined limit. If, however, the ratio is determined by dividing the greater brake lining signal by the smaller brake lining signal, such that their ratio is greater than one, the warning signal 102 may be produced when the ratio exceeds a certain predetermined limit.

The central processor 78 also includes a timing device 88 for timing the period for the first sensor 72A to reach a first predetermined temperature and the second sensor 72B to reach a second predetermined temperature. The timing device 88 respectively produces first 90 and second 92 time-temperature signals when the first 72A and second 72B sensors reach their predetermined temperatures. The first 90 and second 92 time-temperature signals are used to determine the amount of remaining useful brake lining thickness on their respective brake assemblies 56A, 56B.

In the broadest sense, the first 74 and second 76 brake lining signals are based on brake lining temperature measurements taken by the first 72A and second 72B sensors for their respective brake assemblies 56A, 56B. Thus, there brake lining temperature measurements themselves could be compared to a unique predetermined limit. However, ultimately the temperature based brake lining signals 74, 76 are used with other measurements, such as the time-temperature signals 90, 92, the rotation signals 84, 86, and the wheel distance signals 98, 100, to derive other useful data, such as the energy absorbed by each brake assembly 56A, 56B, the work done by each brake assembly 56A, 56B, and the brake force at each brake assembly 56A, 56B.

To summarize, the first 74 and second 76 brake lining signals, in general, can be representative of any of various sensor based measurements, such as the brake lining temperature, energy, work, or force for each respective brake assembly 56A, 56B. The ratio of these brake lining signals 74, 76 is then compared to a corresponding unique predetermined limit which depends on the type of sensor based measure that is used. In the preferred embodiment the ratio of the brake forces for the brake assemblies 56A, 56B are compared to a predetermined force limit to determine whether the slack adjusters 70A, 70B are out of adjustment. Thus, as shown in FIG. 3, the ratio of the brake lining signals 74, 76, based on brake lining temperature measurements, can be compared to a predetermined limit, therefore avoiding the computation of the brake forces F 1, F2, the work done by each brake W1, W2, and the brake energy E1, E2. Similarly, the ratio of the work done by each brake W1, W2 can be compared to a different predetermined limit, thus avoiding computation of the brake forces F1, F2. The same can be said for the ratio of mean interface temperatures $\theta_A$, $\theta_B$ for each brake assembly 56A, 56B, for the ratio of brake energy E1, E2, and the ratio of the brake forces F1, F2 which will be discussed in greater detail below.

Also, it is not necessary that a comparison be made between brake assemblies 56A and 56B. The central processor 78 can compare each respective brake lining signal 74, 76 to a predetermined limit and can activate the warning device 80 if either the first 74 or second brake lining signal achieves the predetermined limit. As discussed, above the predetermined limit will vary depending on which type of brake lining signal 74, 76 is used. Thus, if the brake lining signals 74, 76 are based on the work done by each brake assembly W1, W2, then the central processor will compare W1 and W2 to a unique predetermined limit different from the predetermined limits that would be used for a brake force F1, F2 comparison, or a energy E1, E2 comparison, or a mean interface temperature $\theta_A$, $\theta_B$ comparison.

Figure 4A:
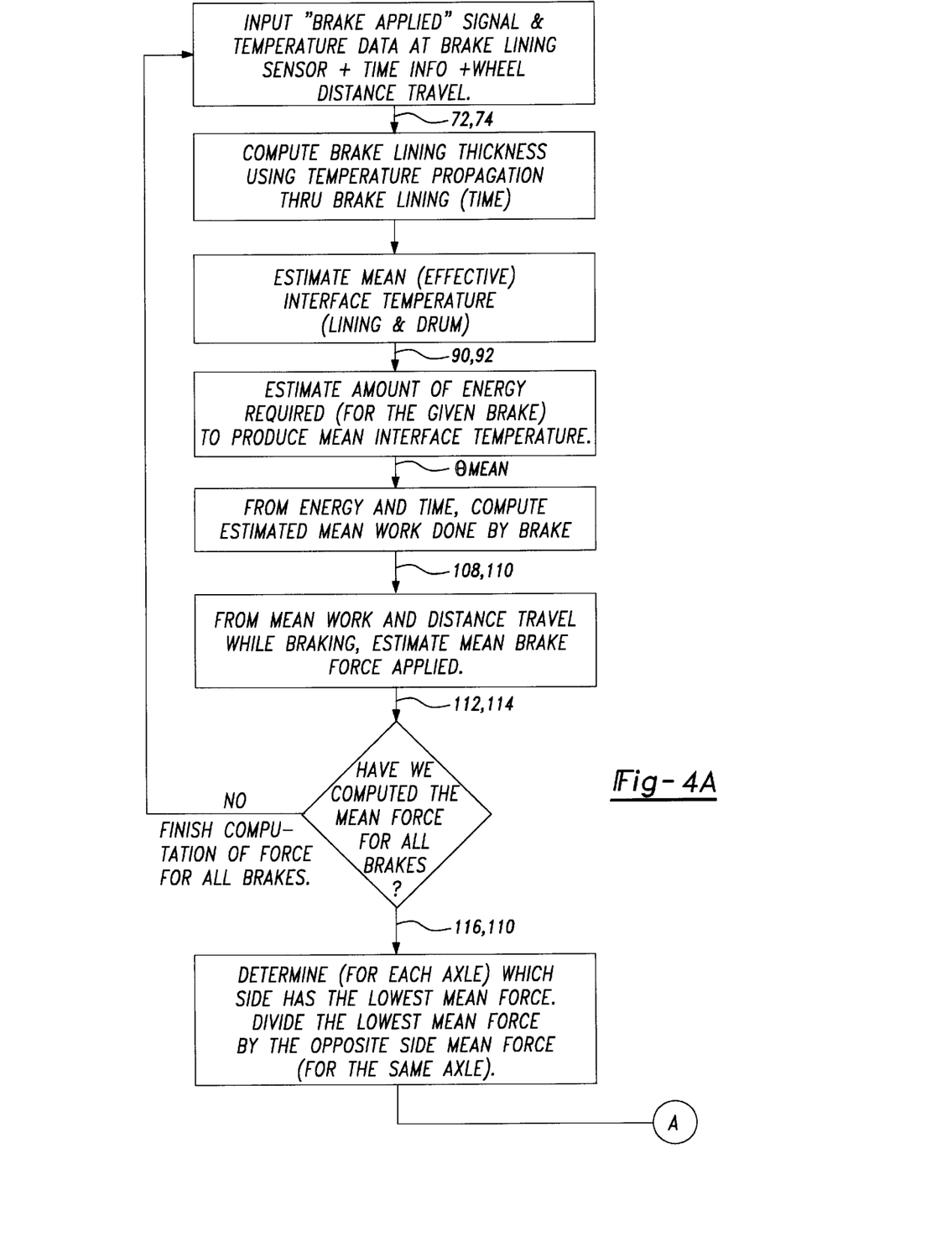
FIG. 4A is a first part of a flow chart of the inventive method.
Figure 4B:
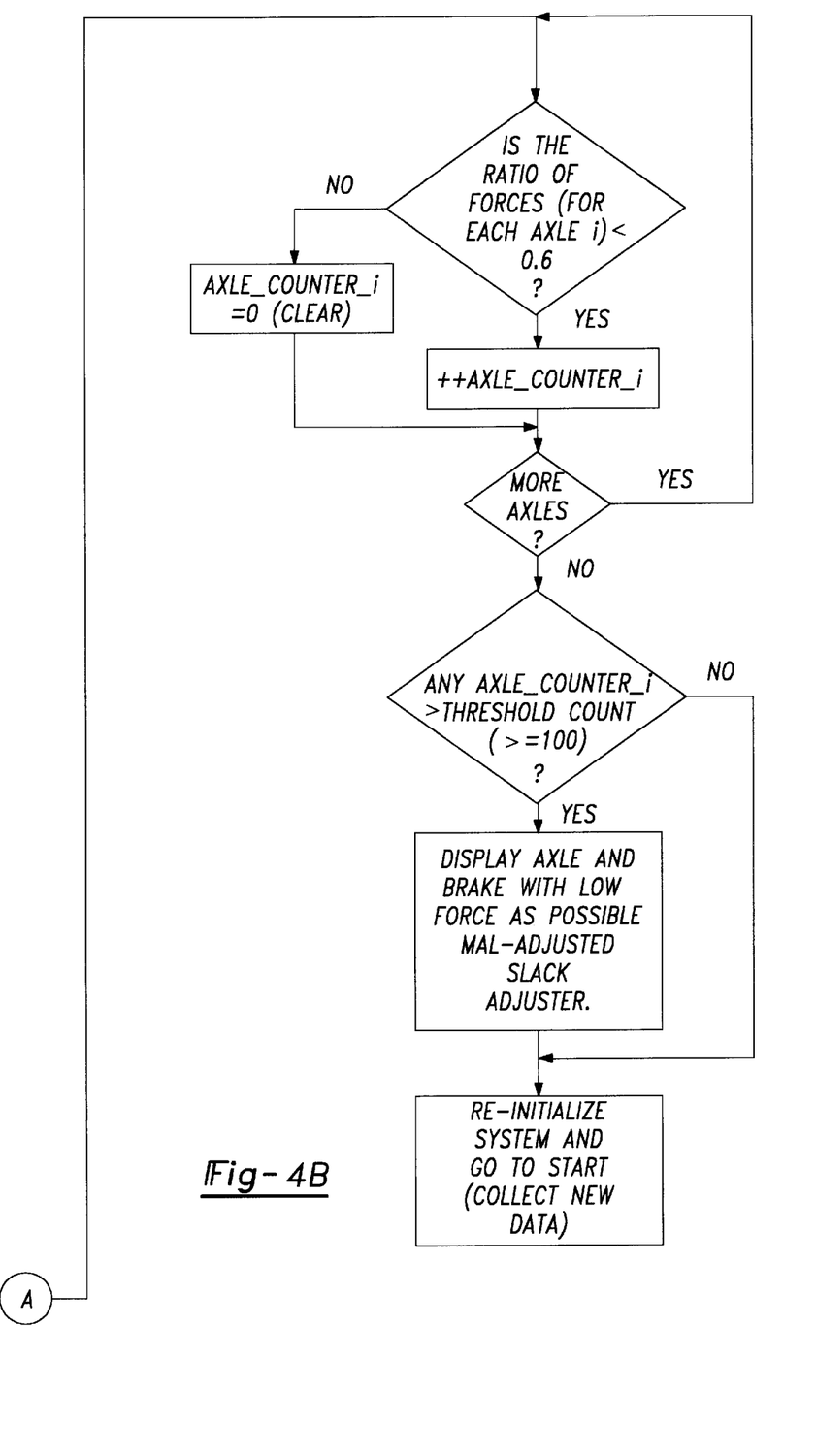
FIG. 4B is a second part of the flow chart shown in FIG. 4A.

A flowchart describing the method for indicating an out of adjustment slack adjuster 70 is shown in FIGS. 4A and 4B. The central processor 78 determines brake lining thicknesses for the first 56A and second 56B brake assemblies based on measurements from the first 72A and second 72B sensors and the first 90 and second 92 time-temperature signals, respectively. The processor 78 also determines the mean interface temperature $\theta_{mean}$ for the first 56A and second 56B brake assemblies based on the rotation signals 84, 86 and brake lining thicknesses for each brake assembly 56A, 56B. The mean interface temperature $\theta_{mean}$ is related to the temperature at the interface between the brake lining 64 and the disc 58.

Two different equations are used to calculate the mean interface temperature $\theta_{mean}$, depending on how long the brake assembly 56A or 56B is applied during a braking application. If the brake 56A or 56B is applied for less than a predetermined time, one formula is used, and if the brake is applied greater than or equal to the predetermined time, another formula is used. In the preferred embodiment the predetermined time is ten seconds, however, other time values can be chosen. When the brake 56A or 56B is applied for less than ten seconds, the mean interface temperature $\theta_{mean}$ is calculated from the following equation:

$$\frac{k_1\theta}{N_1\alpha_1^{1/2}} = 2t^{1/2}\sum_{n=o}^{\infty}\left\{ierfc\frac{(2nd_1+x)}{2(\alpha_1 t)^{1/2}} + ierfc\frac{2(n+1)d_1-x}{2(\alpha_1 t)^{1/2}}\right\} - 8Mt^{3/2}\sum_{n=o}^{\infty}\left\{i^3erfc\frac{(2nd_1+x)}{2(\alpha_1 t)^{1/2}} + i^3erfc\frac{2(n+1)d_1-x}{2(\alpha_1 t)^{1/2}}\right\}$$

wherein $N_1$ is related to the heat inflow into the lining; $k_1$ is a known constant representing the thermal conductivity; $\alpha_1$ is the thermal diffusivity equal to the thermal conductivity, $k_1$, divided by the specific heat, $c_1$, and divided by the density $\rho_1$, all of which are known constants; t is a time variable; x is a distance into the brake lining 64 (at the lining surface x=0) which is determined as a result of the temperature measurements of the first 72A and second 72B sensors and the time-temperature signals 90, 92; $d_1$ is the summation of x and $d_2$ which is a known distance into the brake lining 64 for the sensor assemblies 72A, 72B; and M is equal to the quantity one divided by $t_s$ which represents the measured rotation signals 84, 86.

When the brake 56A or 56B is applied for greater than or equal to ten seconds, the mean interface temperature is calculated from the following equation:

$$\theta = \frac{\alpha_1 N_1}{d_1 k_1}\left[t\left(1-\frac{Mt}{2}\right) - \frac{d_1^2}{6\alpha_1}(1-Mt) + \frac{(1-Mt)(d_1-x)^2}{2\alpha_1} + \frac{Md_1^2}{12\alpha_1^2}(d_1-x)^2 - \frac{7Md_1^4}{360\alpha_1^2} - \frac{M(d_1-x)^4}{24\alpha_1^2}\right]$$

wherein $N_1$ is related to the heat inflow into the lining; $k_1$ is a known constant representing the thermal conductivity; $\alpha_1$ is the thermal diffusivity equal to the thermal conductivity, $k_1$, divided by the specific heat, $c_1$, and divided by the density $\rho_1$, all of which are known constants; t is a time variable; x is a distance into the brake lining 64 (at the lining surface x=0) which is determined based on the temperature measurements of the first 72A and second 72B sensors and the time-temperature signals 90, 92; $d_1$ is the summation of x and $d_2$ which is a known distance into the brake lining 64 for the sensor assemblies 72A, 72B; and M is equal to the quantity one divided by $t_s$ which represents the measured rotation signals 84, 86. These equations are well known in the art and are set forth and explained in further detail in Chapter 4 "Thermal Aspects of Vehicle Braking" of *Braking of Road Vehicles* by T. P. Newcomb and R. T. Spur.

Thus, in addition to utilizing the brake lining temperature measurements from the first 72A and second 72B sensors to produce the first 74 and second 76 brake lining signals, the processor 78 produces the first brake lining signal 74 based on the mean interface temperature of the first brake assembly 56A and produces the second brake lining signal 76 based on the mean interface temperature of the second brake assembly 56B.

As shown schematically in FIG. 3, a fifth sensor assembly 94 measures the velocity, V, of the vehicle and produces a velocity signal 106. The mass $M_V$ of the vehicle and the load it carries is known, thus, a vehicle of mass $M_V$ contains kinetic energy, $E_J$, as defined by the following equation:

$$E_J = \frac{M_v V^2}{2}$$

For the vehicle to stop, this energy must be transferred into heat as the brakes are applied with most of this energy being absorbed by the rotating member of the brake assembly, while the rest is absorbed by the brake lining 64. Therefore, the kinetic energy is proportional to the mean interface temperature $\theta_{mean}$. This relationship is defined by the equation $$E_J = C\theta_{mean}$$

wherein $E_J$ is related to the kinetic energy required to produce the mean interface temperature based on the speed, V, of the vehicle and C is a constant representing the amount of energy required to increase the temperature in the lining by one degree. A first energy signal 108 is produced for the first brake assembly 56A and a second energy signal 110 is produced for the second brake assembly 56B. Thus, in addition to utilizing the brake lining temperature measurements from the first 72A and second 72B sensors and the $\theta_{mean}$ values for the brake assemblies 56A, 56B, the processor 78 produces the first brake lining signal 74 based on the energy signal 108 for the first brake assembly 56A and produces the second brake lining signal 76 based on the energy signal 110 for the second brake assembly 56B.

Once the central processor 78 has determined the energy required to produce the mean interface temperature $\theta_{mean}$, it converts the energy to work, $W_s$, done by each brake assembly 56A, 56B during a braking application, respectively, according to the following equation $$W_s = t_s C\theta_{mean}$$

wherein $W_s$ is related to the amount of work done by the brake assembles, $t_s$ is the rotation signal 84 or 86 representing the time for the disc 58 to stop rotating once the caliper 62 has been applied, and the quantity $C\theta_{mean}$ is the energy, $E_J$. A first work signal 112 is produced for the first brake assembly 56A and a second work signal 114 is produced for the second brake assembly 56B. Thus, in addition to utilizing the brake lining temperature measurements from the first 72A and second 72B sensors, the $\theta_{mean}$ values for the brake assemblies 56A, 56B, and the energy signals 108, 110, the processor 78 produces the first brake lining signal 74 based on the work signal 112 for the first brake assembly 56A and produces the second brake lining signal 76 based on the work signal 114 for the second brake assembly 56B.

Once the work done by each brake is determined, the central processor 78 determines the brake force at each brake 56A, 56B based on the work done by each brake assembly 56A, 56B as defined by the equation $$F = \frac{t_s C\theta_{mean}}{D}$$

wherein F is related to the mean brake force applied for each brake assembly, $t_s$ is the rotation signal 84 or 86 representing the time for the disc 58 to stop rotating once the caliper 62 has been applied, the quantity $C\theta_{mean}$ is the energy, $E_J$, and D is the wheel distance signal 98 or 100 representing the wheel travel distance for a specific brake assembly 56A or 56B during a braking application. A first force signal 116 is produced for the first brake assembly 56A and a second force signal 118 is produced for the second brake assembly 56B. Thus, in addition to utilizing the brake lining temperature measurements from the first 72A and second 72B sensors, the $\theta_{mean}$ values for the brake assemblies 56A, 56B, the energy signals 108,110, and the work signals 112, 114, the processor 78 produces the first brake lining signal 74 based on the force signal 116 for the first brake assembly 56A and produces the second brake lining signal 76 based on the force signal 116 for the second brake assembly 56B.

The central processor 78 compares the brake force signal 116 for the first brake assembly 56A to the brake force signal 118 of the second brake assembly 56B such that their ratio is less than or equal to one. If this ratio is less than the predetermined limit of 0,6 than the warning device 80 is activated by warning signal 102 indicating the slack adjuster 70A or 70B with the lower brake force is possibly out of adjustment. This comparison can be made during each braking application, or a counter device 104, associated with the central processor 78, can count the number of braking applications where the ratio between the first 74 and second brake lining signals 76, i.e., the ratio between the brake force signals 116, 118, is under the predetermined limit of 0.6. The warning device 80 can be activated with a second warning signal 120 when the number of brake applications less than 0.6 exceeds a predetermined number.

In the preferred embodiment the predetermined number is set at one hundred (100) braking applications, however, it should be understood that a number greater than or less than one hundred could be used as a limit. Also, in the preferred embodiment 0.6 is the preferred limit for the comparison of brake forces, however, it is understood that a predetermined limit greater than or less than 0.6 could be used.

The comparison between the first 56A and second 56B brake assemblies is done for each axle assembly 12, 22, 24, 44, 46 on the vehicle. Thus, the warning device 80 which could be either audible or visual, is capable of indicating out of adjustment slack adjusters 70 for each axle 12, 22, 24, 44, 46 on the vehicle. Although a vehicle having ten (10) axles is shown in FIG. 1, it should be understood that the subject invention can be used on a vehicle with any number of axles.

Ultimately, determining whether the slack adjusters 70 are out of adjustment is based on comparing the brake force signal 116 of the first brake assembly 56A to the brake force signal 118 for the second brake assembly 56B for each axle 12, 22, 24, 44, 46. However, the determination of the brake forces directly relates back to the brake lining temperature measurements of each brake assembly 56. From these brake lining temperature measurements, the mean interface temperature $\theta_{mean}$ for each brake assembly 56, the energy $E_J$ absorbed by each brake assembly 56, the work $W_s$ done by each brake assembly 56, and the brake force F for each brake assembly 56 are calculated. It should be understood that a simple comparison between each pair of brake assemblies 56A, 56B based on like quantities for any one of these calculations could be used to determine whether or not a slack adjuster 70 is out of adjustment.

As previously mentioned, it should be understood that the predetermined limit to which the brake lining signals 74, 76, brake force signals 116, 118, etc. are compared, can vary depending upon how the respective signals are compared to each other and can vary depending upon which type of signal is being used. In the preferred embodiment, the ratio is determined by dividing the smaller brake force signal by the greater brake force signal, such that their ratio is less than or equal to one. The warning signal 102 is activated when the ratio is less than the predetermined limit of 0.6. However, if other types of signal pairs are compared, such as energy 108, 110 or work 112, 114 signals, the predetermined limit will vary. The predetermined limit will also vary if the signals are compared such that their ratio is greater than one. Thus, the determination of the predetermined limit to which the various signals are compared, depends upon the type of signal used and whether the ratio of the signals is greater than or less than one.

Note that the sensor assemblies are described individually according to their function. However, it should be understood that some sensor assemblies can be combined and can perform various functions in and of themselves. Thus, for example, time and distance data for each wheel could be measured and transmitted via a single sensor assembly. Also, it is understood that each sensor assembly includes at least one sensor and can include a plurality of sensors.

A preferred embodiment of this invention has been disclosed, however, a worker of ordinary skill in the art would recognize that certain modifications come within the scope of this invention. For that reason, the following claims should be studied to determine the true scope and content of this invention.

We claim:

1. A method for monitoring slack adjustment for braking in a vehicle comprising the steps of:

1) providing an axle with at least first and second brake assemblies, each brake assembly including a first rotating member disposed about an axis of rotation, an actuator, at least one second member having a brake lining supported by a backing plate, and a slack adjuster for adjusting a second member travel distance with respect to said first member as the brake linings wear;

2) actuating said second members against said first members of said first and second brake assemblies;

3) producing a first brake lining signal in response to measuring the temperature of the brake lining of said first brake assembly;

4) producing a second brake lining signal in response to measuring the temperature of the brake lining of said second brake assembly;

5) comparing said first brake lining signal to said second brake lining signal; and 6) producing a first warning signal to indicate an improperly adjusted slack adjuster when the ratio of said first brake lining signal to said second brake lining signal achieves a predetermined limit.

2. A method as set forth in claim 1 wherein producing said first and second brake lining signals for said first and second brake assemblies further includes the steps of:

producing first and second rotation signals in response to timing the period between applying the second members against the first members and the cessation of rotation of the first members;

embedding first and second temperature sensor assemblies into the linings of the first and second brake assemblies, respectively;

producing a first time-temperature signal response to timing the period for the first temperature sensor assembly to reach a first predetermined temperature;

producing a second time-temperature signal in response to timing the period for the second temperature sensor assembly to reach a second predetermined temperature;

determining the brake lining thickness for said first and second brake assemblies based on said first and second time-temperature signals, respectively; and determining first and second mean interface temperatures, related to the temperature at the interface between the linings and the first members, based on the respective rotation signals and the respective brake lining thicknesses wherein said first brake lining signal is related to the first mean interface temperature and said second brake lining signal is related to the second mean interface temperature.

3. A method as set forth in claim 2 wherein producing said first and second brake lining signals for the first and second brake assemblies further includes the steps of:

producing a velocity signal in response to measuring the speed of the vehicle;

measuring the kinetic energy of the vehicle; and producing first and second energy signals, related to the first and second brake lining signals respectively, as defined by the equation $$E_J = C\theta_{mean}$$

wherein $E_J$ is related to the kinetic energy required to produce the first and second mean interface temperatures, C is a constant representing the amount of energy required to increase the temperature in the lining by one degree, and $\theta_{mean}$ is the mean interface temperature.

4. A method as set forth in claim 3 wherein producing said first and second brake lining signals for said first and second brake assemblies further includes the steps of:

producing first and second work signals, related to said first and second brake lining signals respectively, as defined by the equation $$W_s = t_s C\theta_{mean}$$

wherein $W_s$ is related to the amount of work done by the first and second brake assemblies, $t_s$ is the rotation signal, and the quantity $C\theta_{mean}$ is the energy signal, $E_J$.

5. A method as set forth in claim 4 wherein producing said first and second brake lining signals for said first and second brake assemblies further includes the steps of:

producing first and second wheel distance signals in response to measuring the distance for first and second wheels to travel during a braking application; and producing first and second force signals, related to the first and second brake lining signals respectively, as defined by the equation $$F = \frac{t_s C\theta_{mean}}{D}$$

wherein F is related to the mean brake force applied for each brake assembly, ts is the rotation signal, the quantity $C\theta_{mean}$ is the energy signal, $E_J$, and D is the wheel distance signal.

6. A method as set forth in claim 5 including the steps of:

comparing said first force signal to said second force signal such that the ratio of the force signals is less than or equal to one;

counting the brake applications where the ratio between the force signals is less than a second predetermined limit; and producing a second warning signal when the number of brake applications less than the second predetermined limit is greater than a predetermined number.

7. A method as set forth in claim 1 including the steps of dividing the smaller of said brake lining signals by the greater of said brake lining signals, such that the ratio of said brake lining signals is less than or equal to one, and producing said warning signal when their ratio is less than a second predetermined limit.

8. An apparatus for monitoring brake slack adjustment in a vehicle comprising:

at least first and second brake assemblies, each brake assembly including a rotating member disposed about an axis of rotation, a friction member having a brake lining supported by a backing plate, an actuator for actuating said friction member against said rotating member, and a slack adjuster for adjusting the friction member travel distance with respect to said rotating member as said brake lining wears;

a first sensor assembly for measuring the temperature of said brake lining for said first brake assembly, and producing a first brake lining signal;

a second sensor assembly for measuring the temperature of said brake lining for said second brake assembly, and producing a second brake lining signal; and a processor for comparing said first brake lining signal to said second brake lining signal and for activating a warning device, indicating an out of adjustment slack adjuster, when the ratio of said first brake lining signal to said second brake lining signal achieves a predetermined limit.

9. An apparatus as set forth in claim 8 including third and fourth sensor assemblies for said first and second brake assemblies, respectively, wherein said third and fourth sensor assemblies measure the time period from when said friction member is first applied against said rotating member to when said rotating member stops rotating, producing first and second rotation signals, respectively; and a timing device for producing a first time-temperature signal in response to timing the period for said first sensor to reach a first predetermined temperature and for producing a second time-temperature signal in response to timing the period for said second sensor to reach a second predetermined temperature, wherein said first and second sensors are embedded in said brake linings of said first and second brake assemblies, respectively;

wherein said processor determines brake lining thicknesses for said first and second brake assemblies based on the first and second time-temperature signals, respectively;

wherein said processor determines first and second mean interface temperatures for said first and second brake assemblies, respectively, based on said respective rotation signals and respective brak e lining thicknesses, said mean interface temperatures being related to the temperature at the interface between said linings and said rotating members; and wherein said processor produces said first brake lining signal based on said first mean interface temperature and produces said second brake lining signal based on said second mean interface temperature.

10. An apparatus as set forth in claim 9 including a fifth sensor assembly for easuring the speed of said vehicle and wherein said processor determines the kinetic energy required to produce said first and second mean interface temperatures as defined by the equation $$E_J = C\theta_{mean}$$

wherein $E_J$ is related to the kinetic energy required to produce said first and second mean interface temperatures based on the speed of said vehicle, C is a constant representing the amount of energy required to increase the temperature in the lining by one degree, and $\theta_{mean}$ is said mean interface temperature; and wherein said processor produces said first brake lining signal based on said kinetic energy for said first brake assembly and produces said second brake lining signal based on said kinetic energy for said second brake assembly.

11. An apparatus as set forth in claim 10 wherein said processor produces first and second work signals, related to said first and second brake lining signals respectively, as defined by the equation $$W_s = t_s C\theta_{mean}$$

wherein $W_s$ is related to the amount of work done by the first and second brake assemblies, $t_s$ is the rotation signal, and the quantity $C\theta_{mean}$ is the kinetic energy, $E_J$.

12. An apparatus as set forth in claim 11 including sixth and seventh sensor assemblies for measuring wheel distance travel during a braking application for said first and second brake assemblies, respectively; and wherein said processor produces first and second force signals, related to said first and second brake lining signals respectively, as defined by the equation $$F = \frac{t_s C\theta_{mean}}{D}$$

wherein F is related to the mean brake force applied for each of said brake assemblies, $t_s$ is said rotation signal, the quantity $C\theta_{mean}$ is said kinetic energy, $E_J$, and D is said wheel distance signal.

13. An apparatus as set forth in claim 9 wherein for braking applications lasting less than a predetermined time, said mean interface temperature is defined by the equation $$\frac{k_1\theta}{N_1\alpha_1^{1/2}} = 2t^{1/2}\sum_{n=0}^{\infty}\left\{ierfc\frac{(2nd_1+x)}{2(\alpha_1 t)^{1/2}} + ierfc\frac{2(n+1)d_1-x}{2(\alpha_1 t)^{1/2}}\right\} -$$

-continued $$8Mt^{3/2}\sum_{n=0}^{\infty}\left\{i^3 erfc\frac{(2nd_1+x)}{2(\alpha_1 t)^{1/2}} + i^3 erfc\frac{2(n+1)d_1-x}{2(\alpha_1 t)^{1/2}}\right\}$$

wherein $N_1$, is related to the heat inflow into the lining; $k_1$ is a constant representing the thermal conductivity; $\alpha_1$ is the thermal diffusivity equal to the thermal conductivity, $k_1$, divided by the specific heat, $c_1$, and divided by the density $\rho_1$; t is a time variable; x is a distance into the brake lining; $d_1$ is the summation of x and $d_2$ which is a constant; and M is equal to the quantity one divided by $t_s$ which is the rotation signal.

14. An apparatus as set forth in claim 9 wherein for braking applications lasting greater than or equal to a predetermined time, said mean interface temperature is defined by the equation $$\theta = \frac{\alpha_1 N_1}{d_1 k_1}t\left[\left(1-\frac{Mt}{2}\right)-\frac{d_1^2}{6\alpha_1}(1-Mt)+\frac{(1-Mt)(d_1-x)^2}{2\alpha_1}+\frac{Md_1^2}{12\alpha_1^2}(d_1-x)^2-\frac{7Md_1^4}{360\alpha_1^2}-\frac{M(d_1-x)^4}{24\alpha_1^2}\right]$$

wherein $N_1$ is related to the heat inflow into the lining; $k_1$ is a constant representing the thermal conductivity; $\alpha_1$ is the thermal diffusivity equal to the thermal conductivity, $k_1$, divided by the specific heat, $c_1$, and divided by the density $\rho_1$; t is a time variable; x is a distance into the brake lining; $d_1$ is the summation of x and $d_2$ which is a constant; and M is equal to the quantity one divided by $t_s$ which is the rotation signal.

15. An apparatus as set forth in claim 11 including sixth and seventh sensor ssemblies for measuring wheel distance travel during a braking application for said first and second brake assemblies, respectively; and wherein said processor produces first and second force signals as defined by the equation $$F = \frac{t_s C\theta_{mean}}{D}$$

wherein F is related to the mean brake force applied for each of said brake assemblies, $t_s$ is said rotation signal, the quantity $C\theta_{mean}$ is said kinetic energy, $E_J$, and D is said wheel distance signal;

wherein said processor produces said first brake lining signal based on said brake force for said first brake assembly and produces said second brake lining signal based on said brake force for said second brake assembly; and wherein said processor compares said first and second brake lining signals to a fifth predetermined limit and activates said warning device, indicating an out of adjustment slack adjuster, when the said first or second brake lining signal achieves said fifth predetermined limit.

16. An apparatus as set forth in claim 8 including a counter for counting the brake applications where the ratio between said first and second brake lining signals is less than the predetermined limit and wherein said processor activates said warning device when the number of brake applications less than the predetermined limit exceeds a predetermined number.

17. An apparatus for monitoring brake slack adjustment in a vehicle comprising:

at least first and second brake assemblies, each brake assembly including a rotating member disposed about an axis of rotation, a friction member having a brake lining supported by a backing plate, an actuator for actuating said friction member against said rotating member, and a slack adjuster for adjusting the friction member travel distance with respect to said rotating member as said brake lining wears;

a first sensor assembly for measuring the temperature of said brake lining for said first brake assembly, and producing a first brake lining signal;

a second sensor assembly for measuring the temperature of said brake lining for said second brake assembly, and producing a second brake lining signal; and a processor for comparing said first and second brake lining signals to a first predetermined limit and for activating a warning device, indicating an out of adjustment slack adjuster, when the said first or second brake lining signal achieves said first predetermined limit.

18. An apparatus as set forth in claim 17 including third and fourth sensor assemblies for said first and second brake assemblies, respectively, wherein said third and fourth sensor assemblies measure the time period from when said friction member is first applied against said rotating member to when said rotating member stops rotating, producing first and second rotation signals, respectively; and a timing device for producing a first time-temperature signal in response to timing the period for said first sensor to reach a first predetermined temperature and for producing a second time-temperature signal in response to timing the period for said second sensor to reach a second predetermined temperature, wherein said first and second sensors are mbedded in said brake linings of said first and second brake assemblies, respectively;

wherein said processor determines brake lining thicknesses for said first and second brake assemblies based on the first and second time-temperature signals, respectively;

wherein said processor determines first and second mean interface temperatures for said first and second brake assemblies, respectively, based on said respective rotation signals and respective brake lining thicknesses, said mean interface temperatures being related to the temperature at the interface between said linings and said rotating members;

wherein said processor produces said first brake lining signal based on said first mean interface temperature and produces said second brake lining signal based on said second mean interface temperature; and wherein said processor compares said first and second brake lining signals to a second predetermined limit and activates said warning device, indicating an out of adjustment slack adjuster, when the said first or second brake lining signal achieves said second predetermined limit.

19. An apparatus as set forth in claim 18 including a fifth sensor assembly for measuring the speed of said vehicle and wherein said processor determines the kinetic energy required to produce said first and second mean interface temperatures as defined by the equation $$E_J = C\theta_{mean}$$

wherein $E_J$ is related to the kinetic energy required to produce said first and second mean interface temperatures based on the speed of said vehicle, C is a constant representing the amount of energy required to increase the temperature in the lining by one degree, and $\theta_{mean}$ is said mean interface temperature;

wherein said processor produces said first brake lining signal based on said kinetic energy for said first brake assembly and produces said second brake lining signal based on said kinetic energy for said second brake assembly; and wherein said processor compares said first and second brake lining signals to a third predetermined limit and activates said warning device, indicating an out of adjustment slack adjuster, when the said first or second brake lining signal achieves said third predetermined limit.

20. An apparatus as set forth in claim 19 wherein said processor produces first and second work signals as defined by the equation $$W_s = t_s C\theta_{mean}$$

wherein $W_s$ is related to the amount of work done by the first and second brake assemblies, $t_s$ is the rotation signal, and the quantity $C\theta_{mean}$ is the kinetic energy, $E_J$;

wherein said processor produces said first brake lining signal based on said work done by said first brake assembly and produces said second brake lining signal based on said work done by said second brake assembly; and wherein said processor compares said first and second brake lining signals to a fourth predetermined limit and activates said warning device, indicating an out of adjustment slack adjuster, when the said first or second brake lining signal achieves said fourth predetermined limit.

* * * * *